United States Patent [19]
Yamada

[11] Patent Number: 6,029,255
[45] Date of Patent: Feb. 22, 2000

[54] INPUT/OUTPUT CONTROL DEVICE AND METHOD APPLIED TO FAULT-RESILIENT COMPUTER SYSTEM

[75] Inventor: Kunio Yamada, Tokyo, Japan

[73] Assignee: Kabushiki Kaisha Toshiba, Kawasaki, Japan

[21] Appl. No.: 08/960,212

[22] Filed: Oct. 29, 1997

[30] Foreign Application Priority Data

Dec. 26, 1996 [JP] Japan .................................. 8-348063

[51] Int. Cl.⁷ .................................................. G06F 11/00
[52] U.S. Cl. .................................. 714/16; 714/19; 714/47
[58] Field of Search ................................ 714/12, 16, 15, 714/19, 47

[56] References Cited

U.S. PATENT DOCUMENTS 5,600,784 2/1997 Bissett et al. ............................. 714/12
5,615,403 3/1997 Bissett et al. ............................. 714/12
5,790,397 8/1998 Bissett et al. ............................. 714/12
5,896,523 4/1999 Bissett et al. ............................ 713/400

*Primary Examiner*—Joseph E. Palys
*Assistant Examiner*—Nguyen Xuan Nguyen
*Attorney, Agent, or Firm*—Finnegan, Henderson, Farabow, Garrett & Dunner, L.L.P.

[57] ABSTRACT

When an I/O request block is received from a file system, a number-of-system's-failures setting section stores the present number of failures in the I/O request block, and hands over the I/O request block to a software driver after taking a checkpoint. When the I/O request block is received from the software driver, a number-of-failures determining section determines whether or not the number of failures stored in the I/O request block coincides with the present number of failures. If they do not coincide, an I/O request error return section will return the I/O request block to the software driver without handing over it to a device driver and causes an I/O request completion processing section to reissue the I/O request block again.

19 Claims, 10 Drawing Sheets

| READ/WRITE/DEVICE CONTROL | ~51 |
| --- | --- |
| LOCATION IN MEMORY | ~52 |
| LOCATION ON DEVICE | ~53 |
| REQUESTER | ~54 |
| TIME | ~55 |
| COMPLETION STATUS | ~56 |
| NUMBER OF FAILURES | ~57 |
| ⋮ | |

INPUT/OUTPUT CONTROL DEVICE AND METHOD APPLIED TO FAULT-RESILIENT COMPUTER SYSTEM

BACKGROUND OF THE INVENTION

The present invention relates to an input/output control device and method applied to a checkpoint rollback-type fault-resilient computer system.

The act of taking the system's consistent state periodically, returning the system's state to the consistent state in case of a failure, and then restarting the interrupted processing is known as backward recovery or rollback.

In general, the definition "the system's consistent state" includes the states of the memory and the CPU registers, and not the states of the I/O devices (e.g., interface cards). The reason is that the transition of the states of the CPU and the memory is reversible, whereas the transition of the states of the I/O devices is irreversible. Therefore, if an I/O element that executes the processing of I/O devices and a calculation element that executes calculations are integrated into a system, it will be difficult to match the state of one with that of the other once the matching between the two states has collapsed at the time of the occurrence of a fault.

For this reason, with a conventional system, it is a common practice to separate the I/O element from the calculation element to prevent the occurrence of faults in the calculation element from having an adverse effect on the I/O element. Since in the conventional system, the I/O element itself is not resilient to faults, the I/O element is made multiple to realize fault resilience. In this case, the OS running on the I/O element is a unique OS.

Now that, for example, UNIX has been used a virtually standard OS, remodeling the device driver and separating the calculation element from the I/O element become great demerits from the viewpoints of compatibility and cost performance. To avoid these demerits, it is desired to realize a system capable of backward recovery without remodeling the conventional device driver or separating the calculation element from the I/O element.

BRIEF SUMMARY OF THE INVENTION

Accordingly, it is an object of the present invention to provide an input/output control device and method that realizes a system capable of backward recovery without remodeling a conventional device driver or separating the calculation element from the I/O element.

According to an aspect of the present invention, there is provided an input/output control device provided between a higher-level module and a lower-level module in a checkpoint rollback-type computer system, the device comprising: I/O request management means having plural stages of queues, for storing the I/O request block given from the higher-level module into the plural stages of queues one by one in descending order at the time of each checkpoint, and handing over the I/O request block to the lower-level module; means for calling up a reset handler provided in the lower-level module when rollback is carried out; and I/O request completion processing means, responsive to a reset error returned from the lower-level module in answer to the call from the reset handlet, for returning the corresponding I/O request block to a specific one of the plural stages of queues.

According to another aspect of the present invention, there is provided an input/output control device provided between a higher-level module and a lower-level module in a checkpoint rollback-type computer system including a middle-level module, the device comprising: number-of-failures monitor means for holding and incrementing the number of failures each time rollback is carried out owing to the occurrence of a failure; means for assigning the number of failures to the I/O request block given from the higher-level module; I/O request management means having plural stages of queues, for storing the I/O request block given the number of failures into the plural stages of queues one by one in descending order at the time of each checkpoint, and handing over the I/O request block to the middle-level module; means for determining whether or not the number of failures assigned to the I/O request block given from the middle-level module coincides with the number of failures held in the number-of-failures monitor means; means for handing over the corresponding I/O request block to the lower-level module when the result of the determining means shows the coincidence; means for reassigning the number of failures held in the number-of-failures monitor means to the corresponding I/O request block and returning the I/O request block to a specific one of the plural stages of queues when the result of the determining means shows the non-coincidence; means for calling up a reset handler provided in the lower-level module when rollback is carried out; and I/O request completion processing means, responsive to a reset error returned from the lower-level module in answer to the call from the reset handler, for reassigning the number of failures held in the number-of-failures monitor means to the corresponding I/O request block and returning the I/O request block to a specific one of the plural stages of queues.

Each of the above input/output devices may further comprise means for stopping DMA (Direct Memory Access) to prevent the DMA from updating the contents of the memory in the system before rollback is carried out. In each of the devices, the I/O request completion processing means may confirm the reset error by checking for the completion status included in the I/O request block returned from the lower-level module. Furthermore, the lower-level module may be a device driver that controls hardware directly. The higher-level module may be a file system that receives the I/O request block directly from an application program. The middle-level module may be a software driver that controls software.

According to a further aspect of the present invention, there is provided a method of performing input/output control of I/O request blocks transferred between a higher-level module and a lower-level module in a checkpoint rollback-type computer system, the method comprising the steps of: storing the I/O request block given from the higher-level module into plural stages of queues one by one in descending order at the time of each checkpoint, and handing over the I/O request block to the lower-level module; calling up a reset handler provided in the lower-level module when rollback is carried out; and in response to a reset error returned from the lower-level module in answer to the call from the reset handler, returning the corresponding I/O request block to a specific one of the plural stages of queues.

According to another aspect of the present invention, there is provided a method of performing input/output control of I/O request blocks transferred between a higher-level module and a lower-level module in a checkpoint rollback-type computer system including a middle-level module, the method comprising the steps of: holding and incrementing the number of failures each time rollback is carried out owing to the occurrence of a failure; assigning the number of failures to the I/O request block given from the higher-level module; storing the I/O request block given the number of failures into plural stages of queues one by one in descending order at the time of each checkpoint, and handing over the I/O request block to the middle-level module; determining whether or not the number of failures assigned to the I/O request block given from the middle-level module coincides with the held number of failures; handing over the corresponding I/O request block to the lower-level module when the result of the determination shows the coincidence; reassigning the held number of failures to the corresponding I/O request block and returning the I/O request block to a specific one of the plural stages of queues when the result of the determination shows the non-coincidence; calling up a reset handler provided in the lower-level module when rollback is carried out; and in response to a reset error returned from the lower-level module in answer to the call from the reset handler, reassigning the held number of failures to the corresponding I/O request block and returning the I/O request block to a specific one of the plural stages of queues.

Each of the above methods may further comprise the step of stopping DMA (Direct Memory Access) to prevent the DMA from updating the contents of the memory in the system before rollback is carried out. Furthermore, each of the methods may further comprise the step of confirming the reset error by checking for the completion status included in the I/O request block returned from the lower-level module.

According to still a further aspect of the present invention, there is provided a storage medium having program code instructions stored thereon which perform input/output control of I/O request blocks transferred between a higher-level module and a lower-level module in a checkpoint rollback-type computer system when executed by a processor, the instructions comprising: storing the I/O request block given from the higher-level module into plural stages of queues one by one in descending order at the time of each checkpoint, and handing over the I/O request block to the lower-level module; calling up a reset handler provided in the lower-level module when rollback is carried out; and in response to a reset error returned from the lower-level module in answer to the call from the reset handler, returning the corresponding I/O request block to a specific one of the plural stages of queues.

According to another aspect of the present invention, there is provided a storage medium having program code instructions stored thereon which perform input/output control of I/O request blocks transferred between a higher-level module and a lower-level module in a checkpoint rollback-type computer system including a middle-level module when executed by a processor, the instructions comprising: holding and incrementing the number of failures each time rollback is carried out owing to the occurrence of a failure; assigning the number of failures to the I/O request block given from the higher-level module; storing the I/O request block given the number of failures into plural stages of queues one by one in descending order at the time of each checkpoint, and handing over the I/O request block to the middle-level module; determining whether or not the number of failures assigned to the I/O request block given from the middle-level module coincides with the held number of failures; handing over the corresponding I/O request block to the lower-level module when the result of the determination shows the coincidence; reassigning the held number of failures to the corresponding I/O request block and returning the I/O request block to a specific one of the plural stages of queues when the result of the determination shows the non-coincidence; calling up a reset handler provided in the lower-level module when rollback is carried out; and in response to a reset error returned from the lower-level module in answer to the call from the reset handler, reassigning the held number of failures to the corresponding I/O request block and returning the I/O request block to a specific one of the plural stages of queues.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Hereinafter, referring to the accompanying drawings, embodiments of the present invention will be explained.

(First Embodiment)

Figures 1, 3:
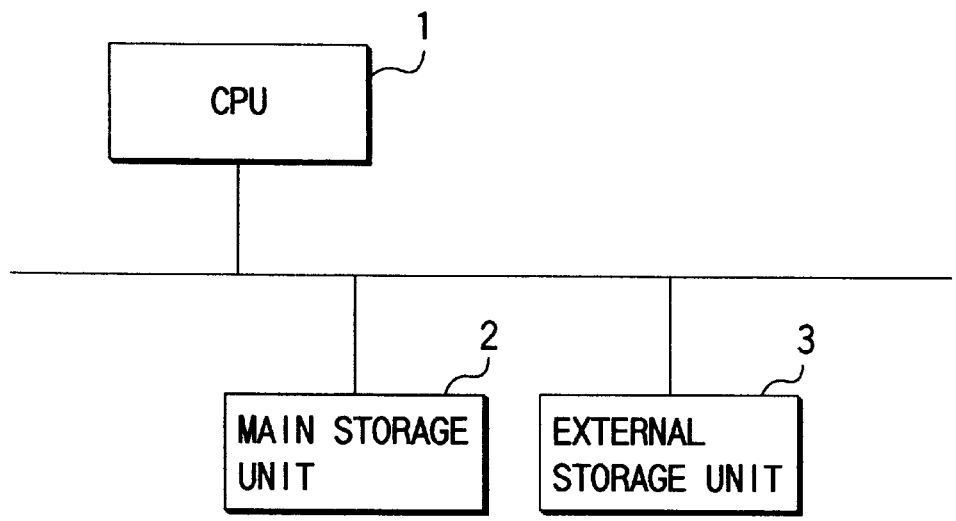
FIG. 1 shows the configuration of a computer system according to a first and second embodiments of the present invention.
FIG. 3 shows an example of a format of an I/O request block in the first embodiment.

A first embodiment of the present invention will be explained. FIG. 1 shows the configuration of a computer system according to the first embodiment. The system of the first embodiment is a checkpoint rollback-type fault-resilient computer system, which has the back recovery function of executing an application program, while taking a checkpoint periodically, and in case of a failure, restarting the execution of the application program from the checkpoint.

As shown in FIG. 1, the computer system of the first embodiment comprises a CPU 1 that controls and executes an operating system and application programs including utilities stored in a main storage unit 2, the main storage unit 2 that stores the operating system and application programs including utilities executed and controlled by the CPU 1 and the data items resulting from these executions, and a large memory capacity external storage unit 3 that exchanges data with the main storage unit 2 and functions as an external memory.

Figure 2:
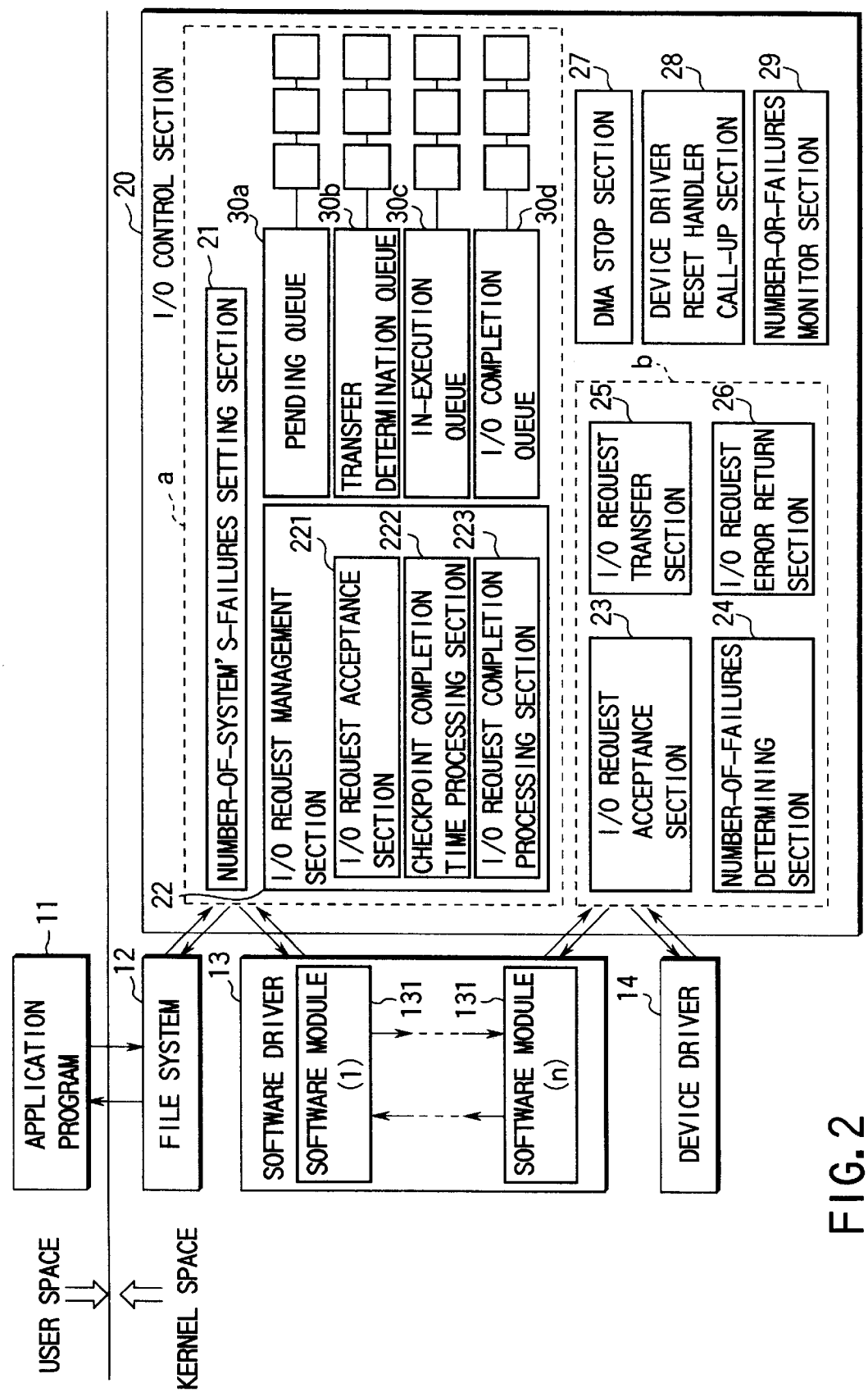
FIG. 2 is a functional block diagram related to the I/O of the first embodiment of the present invention.

FIG. 2 is a functional block diagram related to the I/O of the computer system of the first embodiment. As shown in FIG. 2, the I/O requests (I/O request blocks) issued from the application programs 11 are transferred between a plurality of modules located at multiple stages, while being subjected to various processes. Those modules include a file system 12 serving as a higher-level module that deals with units to be executed again, a software driver 13 acting as a middle-level module, and a device driver 14 serving as a lower-level module that controls hardware directly. In this case, an I/O control section 20 for subjecting the I/O request blocks to various processes intervenes between the file system 12 and the software driver 13 and between the software driver 13 and the device driver 14.

The I/O request block is structured in a format as shown in FIG. 3. Specifically, an I/O request block is composed of a section 51 indicating read/write/device control, a section 52 indicating a location in the memory to be an object of I/O, a section 53 indicating a location on a device to be an object of I/O, a section 54 indicating the requester for the I/O request block, a section 55 indicating time, completion status 56 (explained later in detail), and the number of failures 57 (explained later in detail).

A number-of-failures monitor section 29 in the I/O control section 20 increments the number of failures each time the occurrence of a failure triggers a rollback operation. Any period of time (generation) from the time that a failure occurred to the time that the following failure occurred can be expressed by the number of failures. For example, when the number of failures is two, this means the period of time (generation) from the time the second failure occurred to the time the third failure occurred. Namely, the number-of-failures monitor section 29 monitors the number of failures that indicates what generation the present falls on.

When the file system 12 issues an I/O request block to the software driver 13, an I/O request acceptance section 221 in an I/O request management section 22, receiving the I/O request block, connects it to a pending queue 30a after a number-of-system's-failures setting section 21 stores the number of failures held in the number-of-failures monitor section 29 into the I/O request block.

When a checkpoint has been taken, a checkpoint completion time processing section 222 changes the connection of the I/O request block from the pending queue 30a to a transfer determination queue 30b. Then, the checkpoint completion time processing section 222 sends the I/O request block connected to the transfer determination queue 30b to the software driver 13 and connects the same I/O request block to the queue 30c being executed. Additionally, the checkpoint completion time processing section 222 executes the deletion of the I/O request block connected to an I/O completion queue 30d.

The I/O request block sent from the checkpoint completion time processing section 222 is handed over to the software driver 13. The I/O request block handed over to the software driver 13 passes through a plurality of software modules 131 and then is sent to the I/O control section 20 again.

The I/O request block sent from the software driver 13 is accepted by the I/O request acceptance section 23 in the I/O control section 20. A number-of-failures determining section 24 determines whether the number of failures stored in the I/O request block coincides with the number of failures held in the number-of-failures monitor section 29. If the determination result shows that they coincide, the I/O request transfer section 25 will hand over the I/O request block to the device driver 14. If they do not coincide, the I/O request transfer section 25 will not hand over the I/O request block to the device driver 14, and an I/O request error return section 26 will return a number-of-failures disagreement error to the software driver 13.

When the number-of-failures disagreement error is returned (when the determination result shows disagreement), this means that rollback has been performed after the I/O request block was connected to the transfer determination queue 30b. Therefore, the reissuing of the I/O request block must be assured. To do this, the I/O request completion processing section 223, in response to a number-of-failures disagreement error, connects the I/O request block again to the transfer determination queue 30b, after the number-of-system's-failures setting section 21 stores the number of failures held in the number-of-failures monitor section 29 into the I/O request block. At this time, the I/O request completion processing section 223 also deletes the I/O request block connected to the queue 30c being executed.

When a fault occurs, this assures the reissuing of the I/O request block existing between the time when the checkpoint completion time processing section 222 in the I/O control section 20 sends an I/O request block and the time when the I/O request block reaches the device driver 14.

Now, the procedure for performing rollback in case of a failure will be described.

When rollback is carried out, a DMA stop section 27 stops DMA (Direct Memory Access) related to I/O. The reason is to prevent DMA from updating the contents of the memory. Next, the number-of-failures monitor section 29 increments the number of failures.

Then, a device driver reset handler call-up section 28 calls up a reset handler (not shown) that the device driver 14 has. The reset handler cancels the present I/O process to prepare for a subsequent I/O process. Next, the device driver 14 sets a value indicating a reset error in the completion status section in the I/O request block held therein and returns the I/O request block to the I/O control section 20. In other words, the device driver 14 returns a reset error to the I/O control section 20.

As in the case of the number-of-failures disagreement error, the I/O request completion processing section 223, in response to a reset error, connects the I/O request block again to the transfer determination queue 30b, after the number-of-system's-failures setting section 21 stores the number of failures held in the number-of-failures monitor section 29 into the I/O request block again. At this time, the I/O request completion processing section 223 also deletes the I/O request block connected to the queue 30c being executed.

When a fault has occurred, the I/O request block held in the device driver 14 is connected to the transfer determination queue 30b in response to the reset error sent back from the device driver 14. This assures the reissuing of the I/O request block held in the device driver 14.

With the system of the first embodiment, a system capable of backward recovery can be realized without improving the device driver 14 or separating the calculation element from the I/O element.

The aforementioned four types of queues (30a, 30b, 30c, 30d) have to be secured in an area that will not undergo rollback even if a failure takes place.

Now, the operation procedure of the first embodiment will be described by reference to FIGS. 4 to 8.

Figure 4:
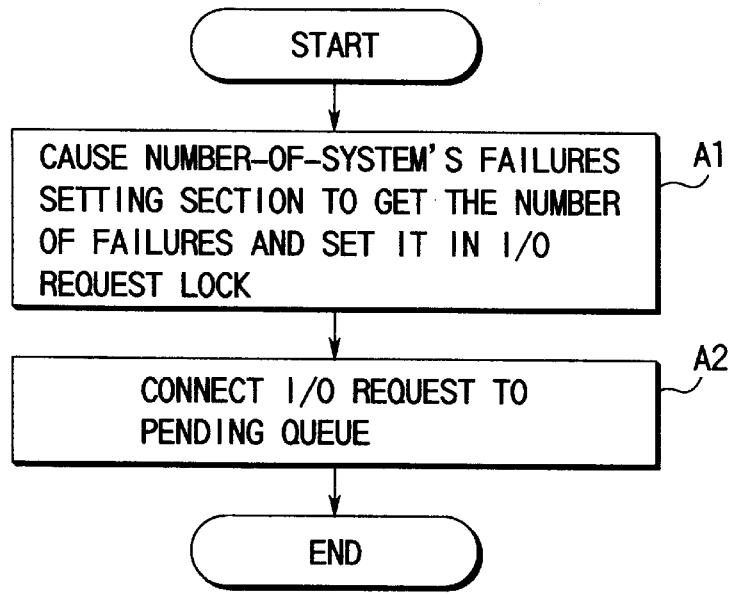
FIG. 4 is a flowchart of the operation procedure of the I/O request acceptance section in the first embodiment.

FIG. 4 is a flowchart of the operation procedure of the I/O request acceptance section 221.

When receiving the I/O request block from the file system 12, the I/O request acceptance section 221 connects the I/O request block to the pending queue 30a (step A2), after the number-of-system's-failures setting section 21 assigns the number of failures held in the number-of-failures monitor section 29 to the I/O request block (step A1).

Figure 5:
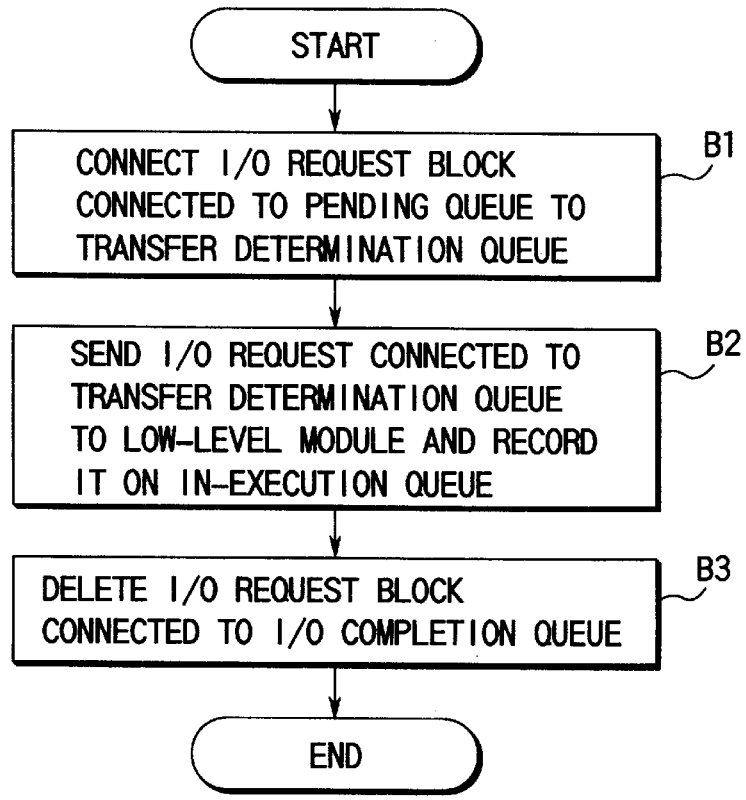
FIG. 5 is a flowchart of the operation procedure of the checkpoint completion time processing section in the first embodiment.

FIG. 5 is a flowchart of the operation procedure of the checkpoint completion time processing section 222.

Taking a checkpoint, the checkpoint completion time processing section 222 changes the connection of the I/O request block from the pending queue 30a to the transfer determination queue 30b (step B1).

Then, the checkpoint completion time processing section 222 sends the I/O request block connected to the transfer determination queue 30b to the software driver 13 and connects the same I/O request block to the queue 30c being executed (step B2).

The checkpoint completion time processing section 222 also deletes the I/O request block connected to the I/O completion queue 30d (step B3).

Figure 6:
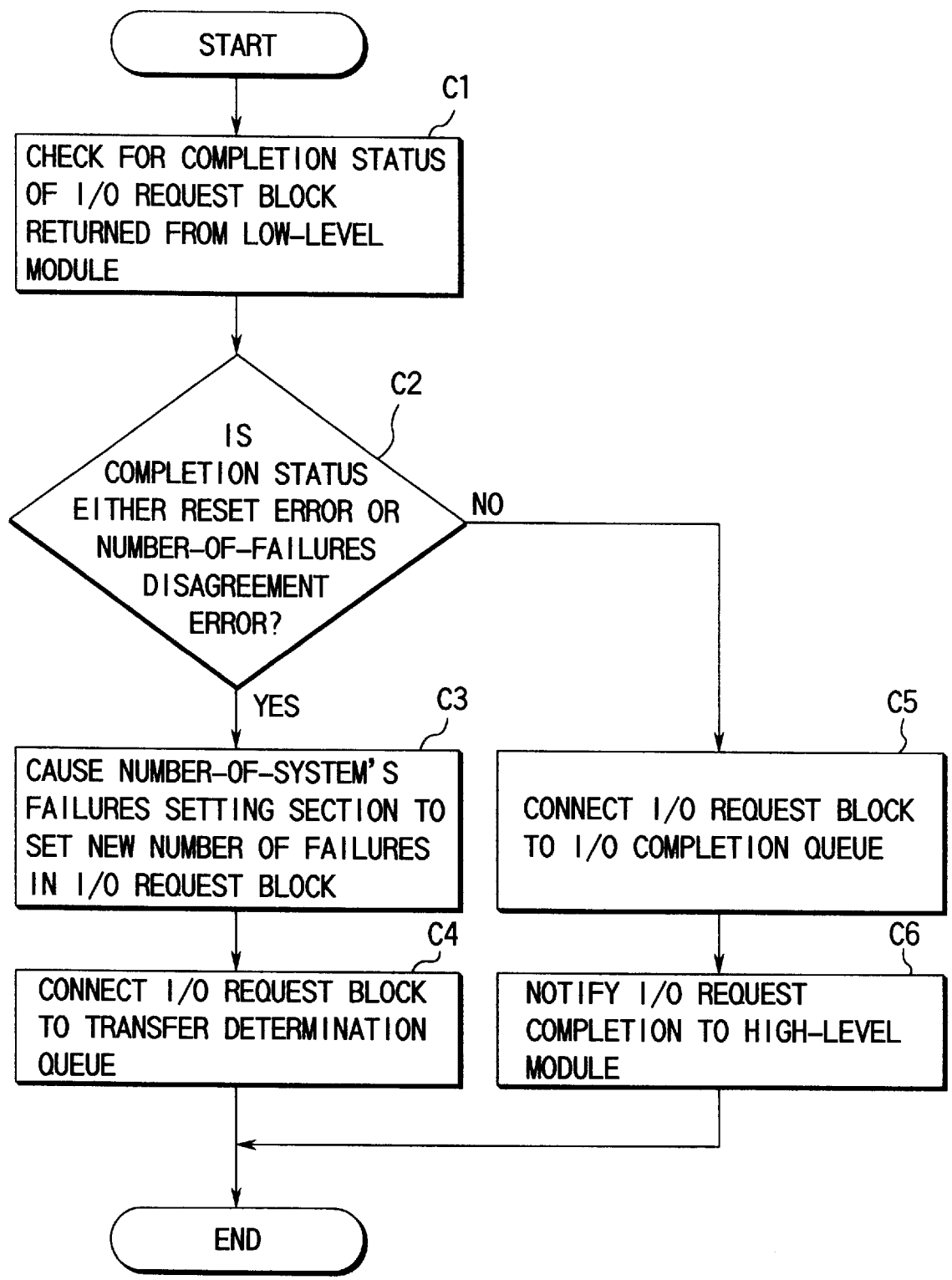
FIG. 6 is a flowchart of the operation procedure of the I/O request completion processing section in the first embodiment.

FIG. 6 is a flowchart of the operation procedure of the I/O request completion processing section 223.

When the device driver 4 as a lower-level module has returned an I/O request block, the I/O request completion processing section 223 checks for the completion status included in the I/O request block (step C1).

When the completion status indicates a reset error, or when the I/O request error return section 26 returns a number-of-failures disagreement error (YES at step C2), the number-of-system's-failures setting section 21 assigns the number of failures held in the number-of-failures monitor section 29 to the I/O request block again (step C3) and connects the I/O request block to the transfer determination queue 30b (step C4). It is desirable that the completion status of the I/O request block should be initialized.

When neither a reset error nor a number-of-failures disagreement error has occurred (NO at step C2), the I/O request block is connected to the I/O completion queue 30d (step C5) and the I/O request completion is notified to the file system 12 as a higher-level module (step C6).

Figure 7:
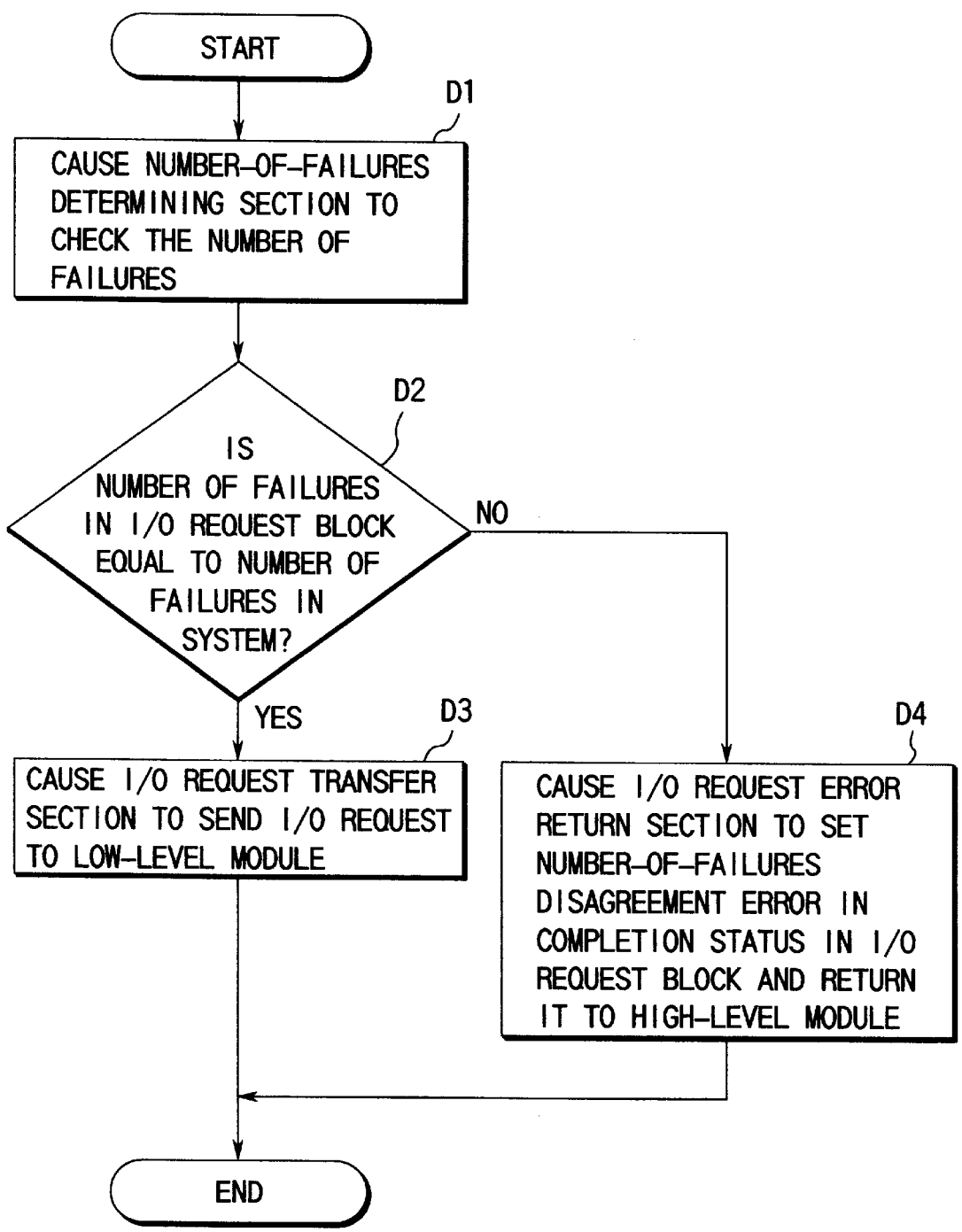
FIG. 7 is a flowchart of the operation procedure of the I/O control section in receiving an I/O request block from the software driver in the first embodiment.

FIG. 7 is a flowchart of the operation procedure of the I/O control section 20 in receiving an I/O request block from the software driver 13.

The I/O request block sent from the software driver 13 is accepted by the I/O request acceptance section 23. The number-of-failures determining section 24 determines whether the number of failures stored in the I/O request block coincides with the number of failures held in the number-of-failures monitor section 29 (step D1).

If the determination result shows that they coincide (YES at step D2), the I/O request transfer section 25 will hand over the I/O request block to the device driver 14 (step D3).

If they do not coincide (NO at step D2), the I/O request error return section 26 returns a number-of-failures disagreement error to the software driver 13 (step D4).

Figure 8:
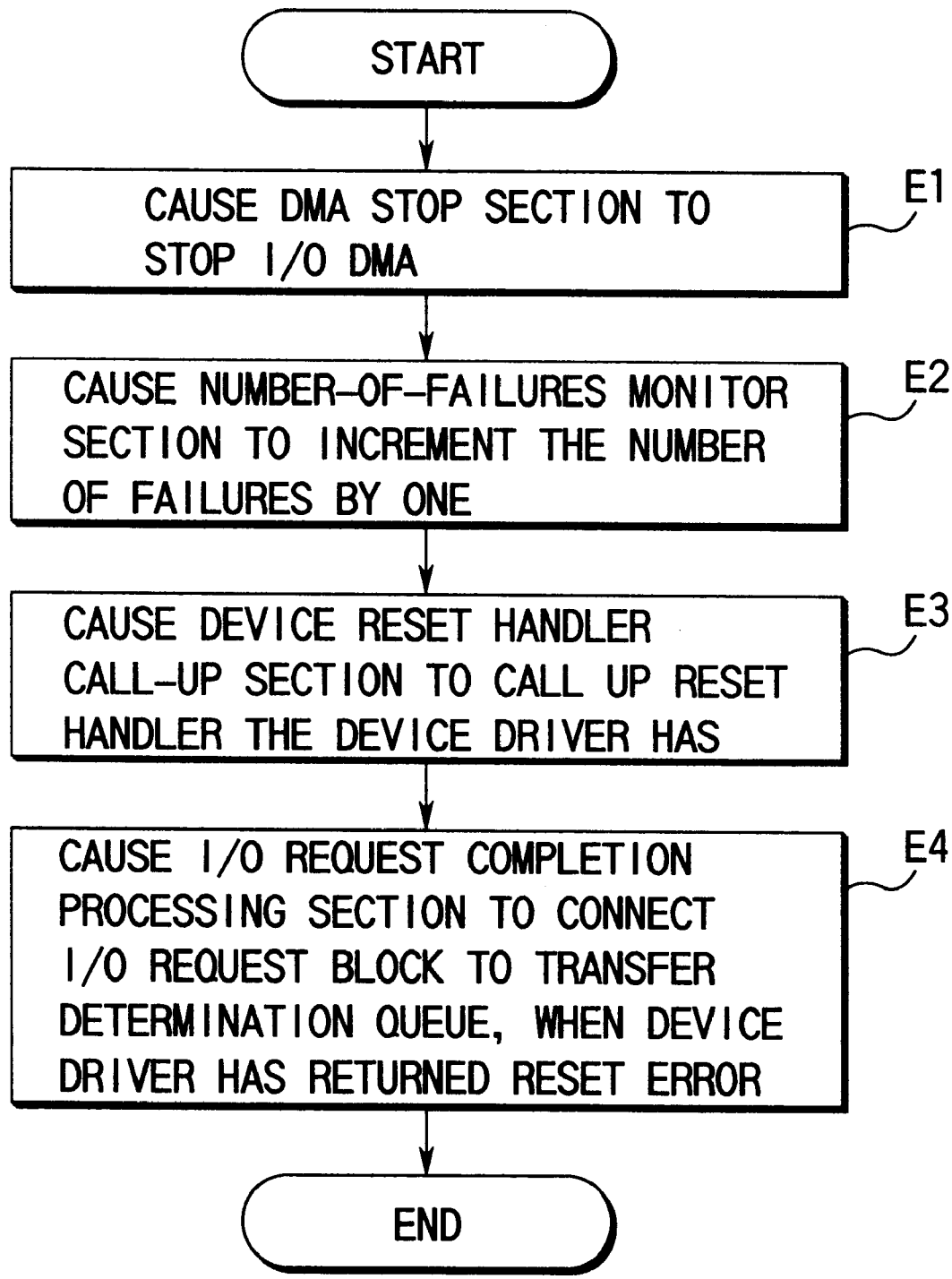
FIG. 8 is a flowchart of the operation procedure when rollback is carried out in the first embodiment.

FIG. 8 is a flowchart of the operation procedure when rollback is carried out in case of a failure.

First, the DMA stop section 27 stops DMA related to I/O (step E1).

Next, the number-of-failures monitor section 29 increments the number of failures (step E2).

Then, the device driver reset handler call-up section 28 calls up the reset handler that the device driver 14 has (step E3).

Thereafter, when the device driver 14 has returned a reset error, the I/O request completion processing section 223 connects the I/O request block to the transfer determination queue 30b (step E4).

With the first embodiment, by using the concept of the number of failures, an I/O request block to be reissued before an I/O request block is handed over to a lower-level module can be distinguished. Furthermore, by checking whether or not a lower-level module has returned a reset error, an I/O request block to be reissued at the time of rollback can be distinguished. Because the I/O request block to be reissued is connected to the transfer determination queue, it is possible to assure the reissuing of the input/output request blocks needed. As a result, it is possible to provide an input/output control device and method that realize a system capable of backward recovery without remodeling the device driver or separating the calculation element from the I/O element.

(Second Embodiment)

Hereinafter, a second embodiment of the present embodiment will be explained.

The configuration of a computer system according to the second embodiment is similar to that of the first embodiment (see FIG. 1).

Figure 9:
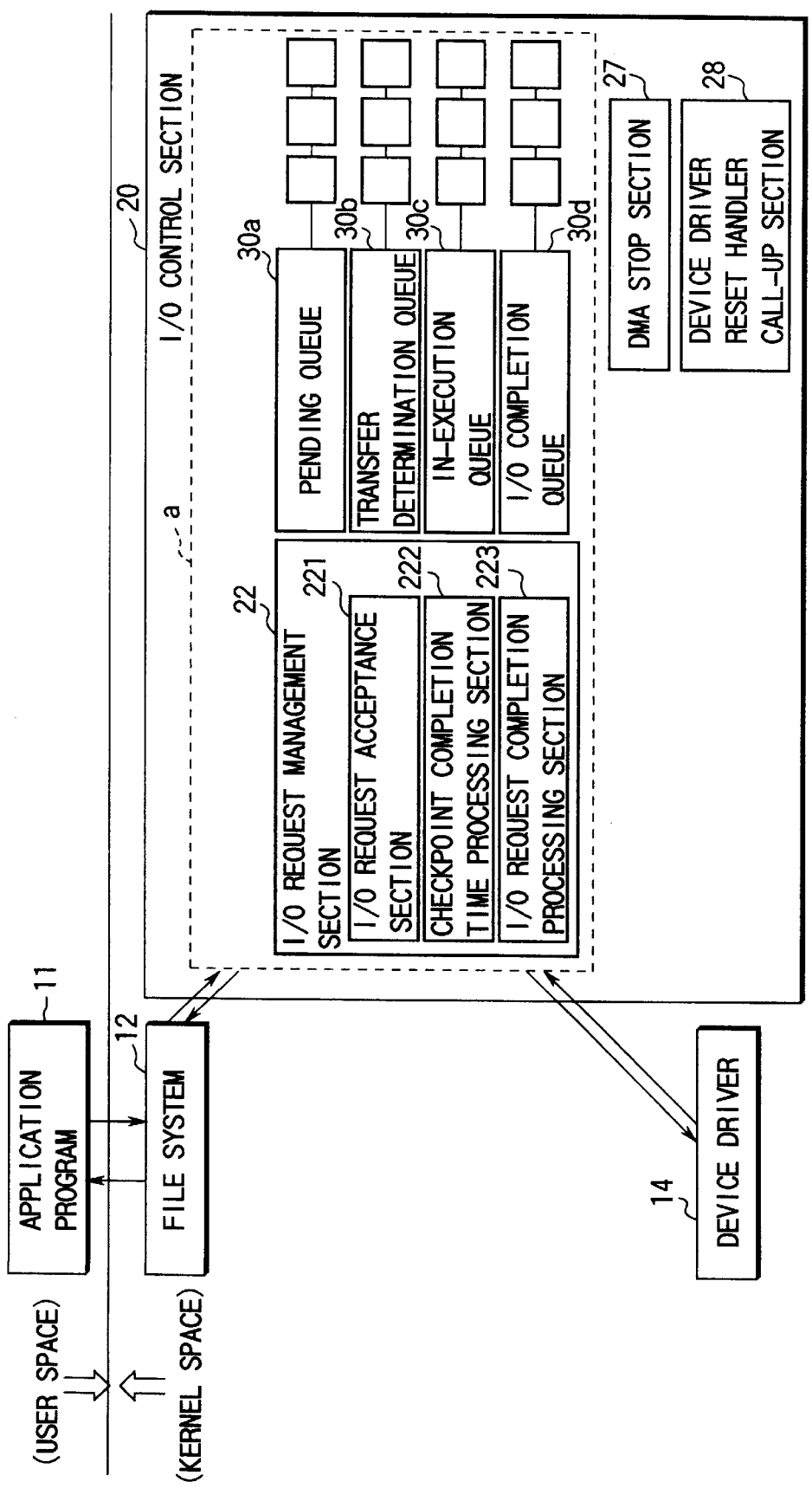
FIG. 9 is a functional block diagram related to the I/O of the second embodiment of the present invention.

FIG. 9 is a functional block diagram related to the I/O of the second embodiment.

The second embodiment differs from the first embodiment in that no module intervenes between the file system 12 as a higher-level module, and the device driver 14 as a lower-level module. As a result, as compared with the first embodiment, the second embodiment is characterized by realizing a system capable of backward recovery without monitoring the number of failures.

Specifically, because all the I/O request blocks sent from the checkpoint completion time processing section 222 are held in the device driver 14, the I/O request completion processing section 223 has only to reissue the I/O request block when a reset error has been returned.

Now, referring to the accompanying drawings, the operation procedure of the second embodiment will be described.

Figure 10:
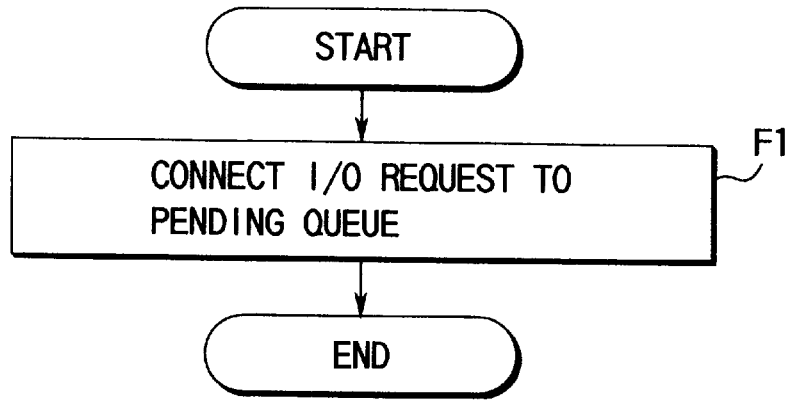
FIG. 10 is a flowchart of the operation procedure of the I/O request acceptance section in the second embodiment.

FIG. 10 is a flowchart of the operation procedure of the I/O request acceptance section 221.

When accepting the I/O request block from the file system 12, the I/O request acceptance section 221 connects the I/O request block to the pending queue 30a (step F1).

Figure 11:
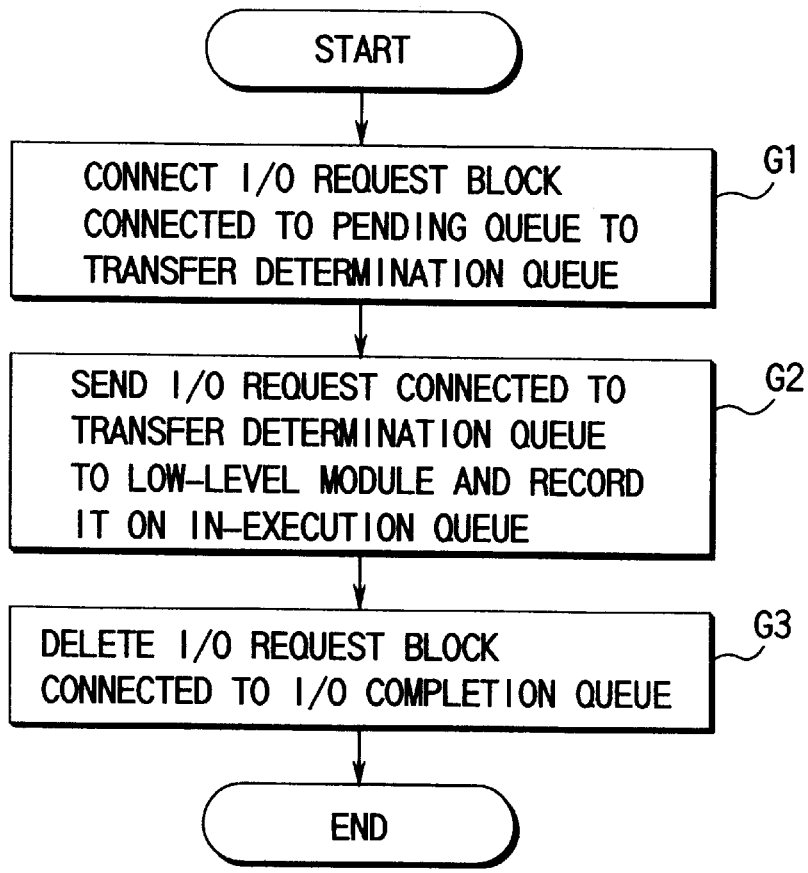
FIG. 11 is a flowchart of the operation procedure of the checkpoint completion time processing section in the second embodiment.

FIG. 11 is a flowchart of the operation procedure of the checkpoint completion time processing section 222.

Taking a checkpoint, the checkpoint completion time processing section 222 changes the connection of the I/O request block from the pending queue 30a to the transfer determination queue 30b (step G1).

Then, the checkpoint completion time processing section 222 sends the I/O request block connected to the transfer determination queue 30b to the device driver 14 as a lower-level module, and connects the same I/O request block to the queue 30c being executed (step G2).

The checkpoint completion time processing section 222 also deletes the I/O request block connected to the I/O completion queue 30d (step G3).

Figure 12:
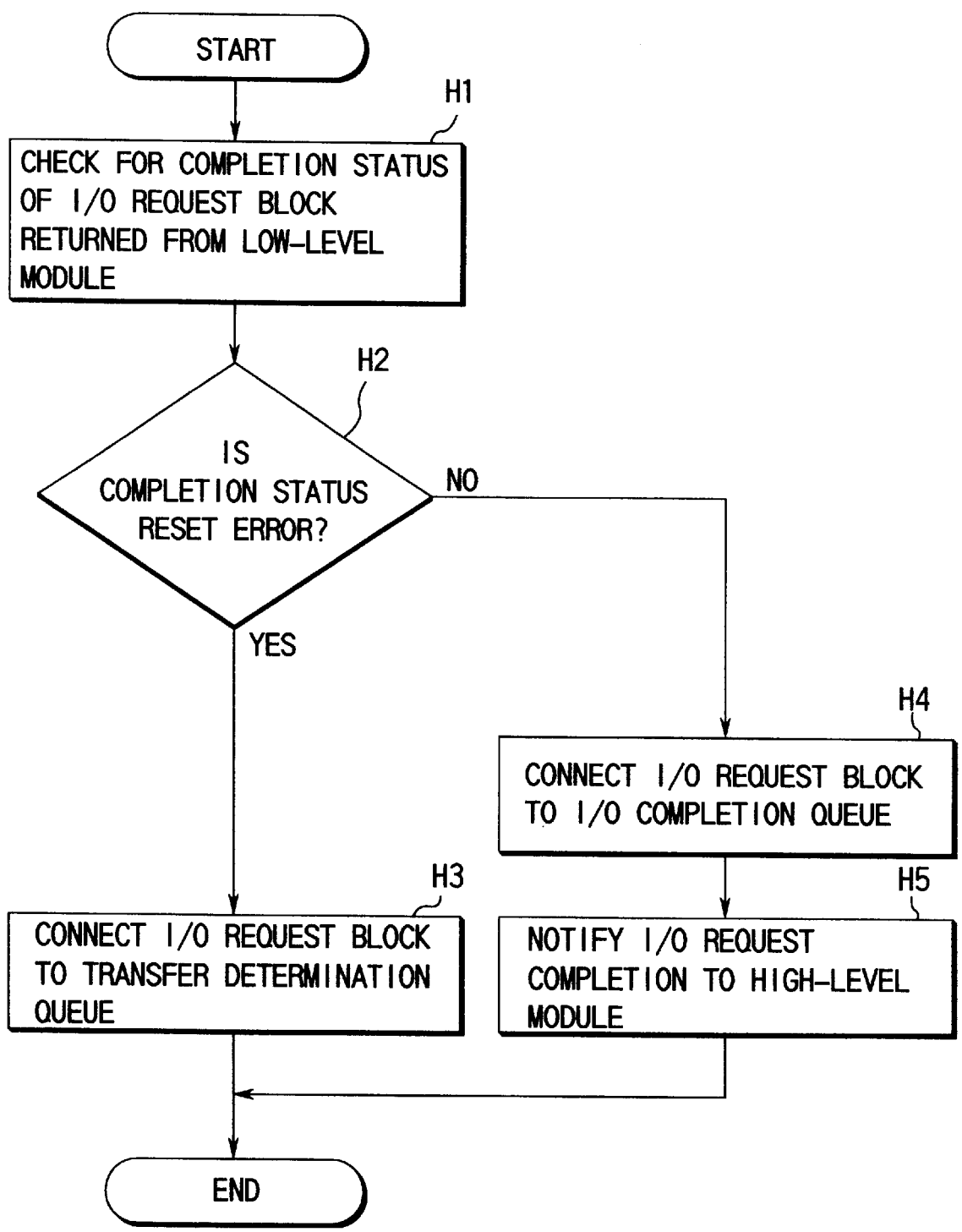
FIG. 12 is a flowchart of the operation procedure of the I/O request completion processing section in the second embodiment.

FIG. 12 is a flowchart of the operation procedure of the I/O request completion processing section 223.

When the device driver 14 as a lower-level module has returned an I/O request block, the I/O request completion processing section 223 checks for the completion status included in the I/O request block (step H1).

When the completion status indicates a reset error (YES at step H2), the I/O request completion processing section connects the I/O request block to the transfer determination queue 30b (step H3).

When the completion status is not a reset error (NO at step H2), the I/O request completion processing section connects the I/O request block to the I/O completion queue 30d (step H4) and notifies the I/O request completion to the file system 12 as a higher-level module (step H5).

Figure 13:
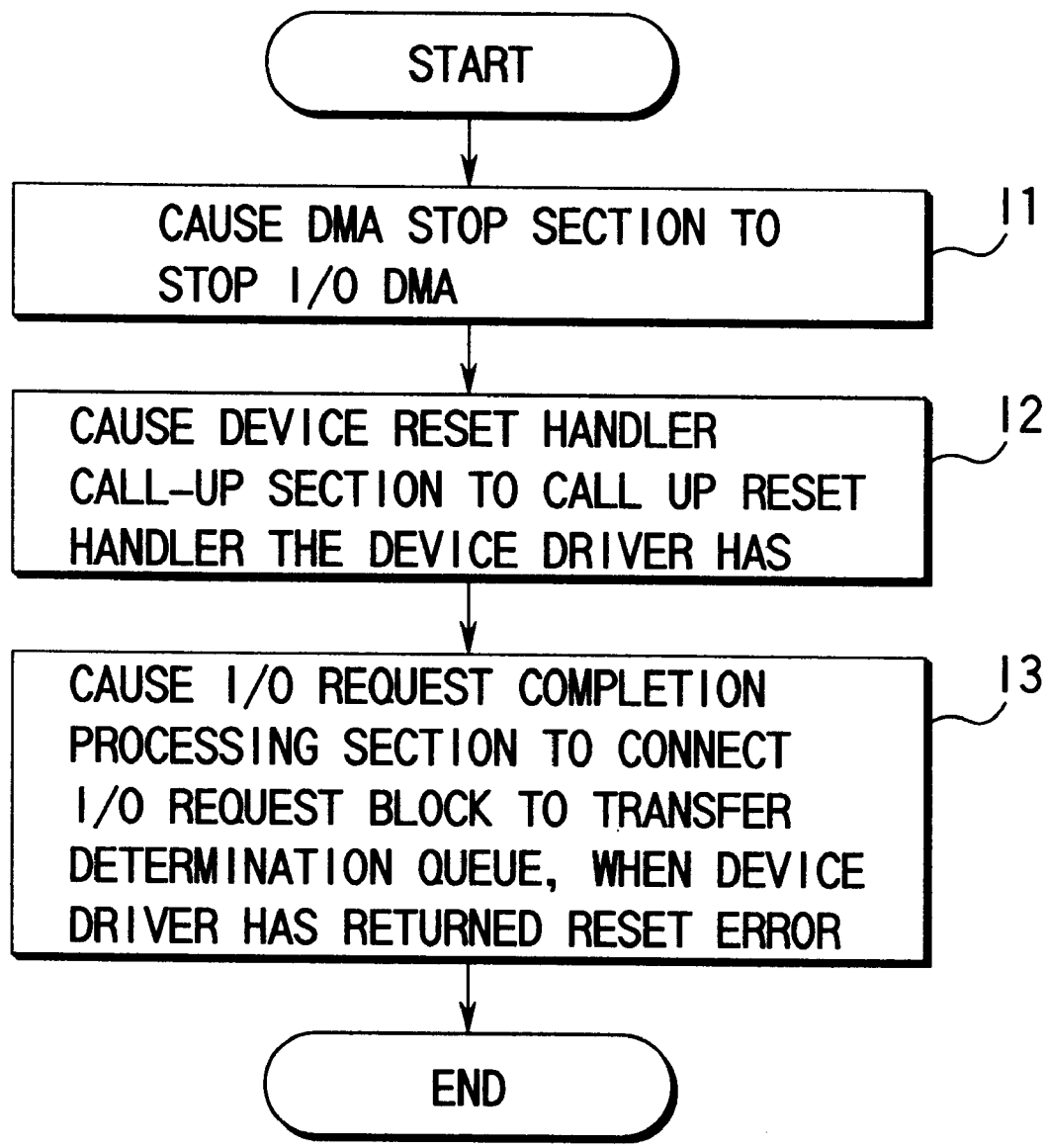
FIG. 13 is a flowchart of the operation procedure when rollback is carried out in the second embodiment.

FIG. 13 is a flowchart of the operation procedure when rollback is carried out in case of a failure.

First, the DMA stop section 27 stops DMA related to I/O (step I1).

Then, the device driver reset handler call-up section 28 calls up the reset handler that the device driver 14 has (step I2).

Thereafter, when the device driver 14 has returned a reset error, the I/O request completion processing section 223 connects the I/O request block to the transfer determination queue 30b (step I3).

With the second embodiment, by checking whether or not a lower-level module has returned a reset error, an I/O request block to be reissued at the time of rollback can be distinguished. Because the I/O request block to be reissued is connected to the transfer determination queue, it is possible to assure the reissuing of the input/output request blocks needed. As a result, it is possible to provide an input/output control device and method that realize a system capable of backward recovery without remodeling the device driver or separating the calculation element from the I/O element.

With both of the first and second embodiments, when the area used by DMA is fixed and the reset handler of the device driver 14 assures the initialization of the area used by DMA, DMA stop by the DMA stop section 27 at the time of rollback may be eliminated, which helps reduce the overhead spent on backward recovery.

The input/output control methods described in the embodiments can be recorded in storage mediums, such as floppy disks, optical disks, or semiconductor memories, in the form of programs code instructions that a processor in the system can execute. The thus obtained storage mediums can then be distributed.

As explained so far in detail, with the present invention, it is possible to provide an input/output control device and method that realize a system capable of backward recovery without remodeling the device driver or separating the calculation element from the I/O element.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An input/output control device provided between a higher-level module and a lower-level module in a checkpoint rollback-type computer system, said device comprising:

I/O request management means having plural stages of queues, for storing the I/O request block given from said higher-level module into said plural stages of queues in a predetermined order at the time of each checkpoint, and handing over the I/O request block to said lower-level module;

means for calling up a reset handler provided in said lower-level module when rollback is carried out; and I/O request completion processing means, responsive to a reset error returned from said lower-level module in answer to the call from said reset handlet, for returning the corresponding I/O request block to a specific one of said plural stages of queues.

2. A device according to claim 1, further comprising:

means for stopping DMA (Direct Memory Access) to prevent the DMA from updating the contents of the memory in said system before rollback is carried out.

3. A device according to claim 1, wherein said I/O request completion processing means confirms said reset error by checking for the completion status included in the I/O request block returned from said lower-level module.

4. A device according to claim 1, wherein said lower-level module is a device driver that controls hardware directly.

5. A device according to claim 1, wherein said higher-level module is a file system that receives said I/O request block directly from an application program.

6. An input/output control device provided between a higher-level module and a lower-level module in a checkpoint rollback-type computer system including a middle-level module, said device comprising:

number-of-failures monitor means for holding and incrementing the number of failures each time rollback is carried out owing to the occurrence of a failure;

means for assigning said number of failures to the I/O request block given from said higher-level module;

I/O request management means having plural stages of queues, for storing the I/O request block given said number of failures into said plural stages of queues in a predetermined order at the time of each checkpoint, and handing over the I/O request block to said middle-level module;

means for determining whether or not the number of failures assigned to the I/O request block given from said middle-level module coincides with the number of failures held in said number-of-failures monitor means;

means for handing over the corresponding I/O request block to said lower-level module when the result of said determining means shows the coincidence;

means for reassigning the number of failures held in said number-of-failures monitor means to the corresponding I/O request block and returning the I/O request block to a specific one of said plural stages of queues when the result of said determining means shows the non-coincidence;

means for calling up a reset handler provided in said lower-level module when rollback is carried out; and I/O request completion processing means, responsive to a reset error returned from said lower-level module in answer to the call from said reset handler, for reassigning the number of failures held in said number-of-failures monitor means to the corresponding I/O request block and returning the I/O request block to a specific one of said plural stages of queues.

7. A device according to claim 6, further comprising:

means for stopping DMA (Direct Memory Access) to prevent the DMA from updating the contents of the memory in said system before rollback is carried out.

8. A device according to claim 6, wherein said I/O request completion processing means confirms said reset error by checking for the completion status included in the I/O request block returned from said lower-level module.

9. A device according to claim 6, wherein said lower-level module is a device driver that controls hardware directly.

10. A device according to claim 6, wherein said higher-level module is a file system that receives said I/O request block directly from an application program.

11. A device according to claim 6, wherein said middle-level module is a software driver that controls software.

12. A method of performing input/output control of I/O request blocks transferred between a higher-level module and a lower-level module in a checkpoint rollback-type computer system, said method comprising the steps of:

storing the I/O request block given from said higher-level module into plural stages of queues in a predetermined order at the time of each checkpoint, and handing over the I/O request block to said lower-level module;

calling up a reset handler provided in said lower-level module when rollback is carried out; and in response to a reset error returned from said lower-level module in answer to the call from said reset handler, returning the corresponding I/O request block to a specific one of said plural stages of queues.

13. A method according to claim 12, further comprising the step of:

stopping DMA (Direct Memory Access) to prevent the DMA from updating the contents of the memory in said system before rollback is carried out.

14. A method according to claim 12, further comprising the step of:

confirming said reset error by checking for the completion status included in the I/O request block returned from said lower-level module.

15. A method of performing input/output control of I/O request blocks transferred between a higher-level module and a lower-level module in a checkpoint rollback-type computer system including a middle-level module, said method comprising the steps of:

holding and incrementing the number of failures each time rollback is carried out owing to the occurrence of a failure;

assigning said number of failures to the I/O request block given from said higher-level module;

storing the I/O request block given said number of failures into plural stages of queues in a predetermined order at the time of each checkpoint, and handing over the I/O request block to said middle-level module;

determining whether or not the number of failures assigned to the I/O request block given from said middle-level module coincides with the held number of failures;

handing over the corresponding I/O request block to said lower-level module when the result of said determination shows the coincidence;

reassigning said held number of failures to the corresponding I/O request block and returning the I/O request block to a specific one of said plural stages of queues when the result of said determination shows the non-coincidence;

calling up a reset handler provided in said lower-level module when rollback is carried out; and in response to a reset error returned from said lower-level module in answer to the call from said reset handler, reassigning said held number of failures to the corresponding I/O request block and returning the I/O request block to a specific one of said plural stages of queues.

16. A method according to claim 15, further comprising the step of:

stopping DMA (Direct Memory Access) to prevent the DMA from updating the contents of the memory in said system before rollback is carried out.

17. A method according to claim 15, further comprising the step of:

confirming said reset error by checking for the completion status included in the I/O request block returned from said lower-level module.

18. A storage medium having program code instructions stored thereon which perform input/output control of I/O request blocks transferred between a higher-level module and a lower-level module in a checkpoint rollback-type computer system when executed by a processor, said instructions comprising:

storing the I/O request block given from said higher-level module into plural stages of queues in a predetermined order at the time of each checkpoint, and handing over the I/O request block to said lower-level module;

calling up a reset handler provided in said lower-level module when rollback is carried out; and in response to a reset error returned from said lower-level module in answer to the call from said reset handler, returning the corresponding I/O request block to a specific one of said plural stages of queues.

19. A storage medium having program code instructions stored thereon which perform input/output control of I/O request blocks transferred between a higher-level module and a lower-level module in a checkpoint rollback-type computer system including a middle-level module when executed by a processor, said instructions comprising:

holding and incrementing the number of failures each time rollback is carried out owing to the occurrence of a failure;

assigning said number of failures to the I/O request block given from said higher-level module;

storing the I/O request block given said number of failures into plural stages of queues in a predetermined order at the time of each checkpoint, and handing over the I/O request block to said middle-level module;

determining whether or not the number of failures assigned to the I/O request block given from said middle-level module coincides with the held number of failures;

handing over the corresponding I/O request block to said lower-level module when the result of said determination shows the coincidence;

reassigning said held number of failures to the corresponding I/O request block and returning the I/O request block to a specific one of said plural stages of queues when the result of said determination shows the non-coincidence;

calling up a reset handler provided in said lower-level module when rollback is carried out; and in response to a reset error returned from said lower-level module in answer to the call from said reset handler, reassigning said held number of failures to the corresponding I/O request block and returning the I/O request block to a specific one of said plural stages of queues.

\* \* \* \* \*

UNITED STATES PATENT AND TRADEMARK OFFICE
CERTIFICATE OF CORRECTION

PATENT NO. : 6,029,255
DATED : February 22, 2000
INVENTOR : Kunio YAMADA

It is certified that error appears in the above-identified patent and that said Letters Patent is hereby corrected as shown below:

Claim 1, Col. 10, line 22, "handlet", should read --handler--.

Signed and Sealed this

Twenty-seventh Day of March, 2001

Attest:

NICHOLAS P. GODICI

Attesting Officer

*Acting Director of the United States Patent and Trademark Office*